US011674352B2

(12) United States Patent
Oehring et al.

(10) Patent No.: US 11,674,352 B2
(45) Date of Patent: *Jun. 13, 2023

(54) SLIDE OUT PUMP STAND FOR HYDRAULIC FRACTURING EQUIPMENT

(71) Applicant: U.S. Well Services, LLC, Houston, TX (US)

(72) Inventors: Jared Oehring, Houston, TX (US); Brandon Neil Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,186

(22) Filed: Sep. 9, 2019

(65) Prior Publication Data

US 2020/0071998 A1   Mar. 5, 2020

Related U.S. Application Data

(63) Continuation of application No. 15/217,081, filed on Jul. 22, 2016, now Pat. No. 10,407,990.

(Continued)

(51) Int. Cl.
*E21B 7/02* (2006.01)
*F04B 47/02* (2006.01)
(Continued)

(52) U.S. Cl.
CPC ............... *E21B 7/02* (2013.01); *E21B 7/022* (2013.01); *E21B 7/026* (2013.01); *B60P 3/00* (2013.01);
(Continued)

(58) Field of Classification Search
CPC ............ E21B 7/02; E21B 7/022; E21B 7/026
See application file for complete search history.

(56) References Cited

U.S. PATENT DOCUMENTS

| 1,541,601 A | 6/1925 | Tribe |
| 1,656,861 A | 1/1928 | Leonard |

(Continued)

FOREIGN PATENT DOCUMENTS

| CA | 2406801 | 11/2001 |
| CA | 2707269 | 12/2010 |

(Continued)

OTHER PUBLICATIONS

Non-Final Office Action issued in corresponding U.S. Appl. No. 16/170,695 dated Jun. 7, 2019.

(Continued)

*Primary Examiner* — Kristyn A Hall
(74) *Attorney, Agent, or Firm* — Hogan Lovells US LLP

(57) ABSTRACT

A hydraulic fracturing system has a pump driven by an electrically powered motor. The pump pressurizes fluid which is piped into a wellbore to fracture a subterranean formation. The pump and motor are mounted on a trailer that is hitched to a tractor. A platform assembly is mounted onto the trailer, and which is selectively moveable between deployed and stowed configurations. The platform assembly includes a platform, a lateral rail assembly mounted to the platform, and gates on the forward and aft ends of the platform. The rail assembly and gates define a safety barrier to prevent operations personnel from falling off the platform. In the stowed configuration the platform assembly is anchored in place over wheels on the trailer. In the deployed configuration, the platform assembly provides work surface so that operations personnel can readily access the pump on the trailer.

12 Claims, 5 Drawing Sheets

Related U.S. Application Data

(60) Provisional application No. 62/196,525, filed on Jul. 24, 2015.

(51) Int. Cl.
  *F04B 17/03* (2006.01)
  *B60P 3/00* (2006.01)
  *B60P 7/08* (2006.01)
  *F04B 49/06* (2006.01)

(52) U.S. Cl.
  CPC ............. *B60P 7/0815* (2013.01); *F04B 17/03* (2013.01); *F04B 47/02* (2013.01); *F04B 49/06* (2013.01)

(56) References Cited

U.S. PATENT DOCUMENTS

| | | |
|---|---|---|
| 1,671,436 A | 5/1928 | Melott |
| 1,743,771 A | 1/1930 | Hall |
| 1,967,466 A | 7/1934 | Damsel |
| 2,004,077 A | 6/1935 | McCartney |
| 2,183,364 A | 12/1939 | Bailey |
| 2,220,622 A | 11/1940 | Aitken |
| 2,244,106 A | 6/1941 | Granberg |
| 2,248,051 A | 7/1941 | Armstrong |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 2,976,025 A | 3/1961 | Pro |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 3,967,841 A | 7/1976 | Kendrick |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,432,064 A | 2/1984 | Barker |
| 4,442,665 A | 4/1984 | Fick |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,601,629 A | 7/1986 | Zimmerman |
| 4,676,063 A | 6/1987 | Goebel et al. |
| 4,759,674 A | 7/1988 | Schroder |
| 4,768,884 A | 9/1988 | Elkin |
| 4,783,038 A | 11/1988 | Gilbert |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,486,047 A | 1/1996 | Zimmerman |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar |
| 6,442,942 B1 | 9/2002 | Kopko |
| 6,477,852 B2 | 11/2002 | Dodo |
| 6,484,490 B1 | 11/2002 | Olsen |
| 6,491,098 B1 | 12/2002 | Dallas |
| 6,510,695 B1 | 1/2003 | Fisher |
| 6,529,135 B1 | 3/2003 | Bowers et al. |
| 6,585,455 B1 | 7/2003 | Petersen et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,788,022 B2 | 9/2004 | Sopko |
| 6,802,690 B2 | 10/2004 | Han |
| 6,808,303 B2 | 10/2004 | Fisher |
| 6,837,910 B1 | 1/2005 | Koshikawa |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,279,655 B2 | 10/2007 | Blutke |
| 7,308,933 B1 | 12/2007 | Mayfield |
| 7,309,835 B2 | 12/2007 | Morrison |
| 7,312,593 B1 | 12/2007 | Streicher et al. |
| 7,336,514 B2 | 2/2008 | Amarillas |
| 7,341,287 B2 | 3/2008 | Gibb |
| 7,445,041 B2 | 11/2008 | O'Brien |
| 7,494,263 B2 | 2/2009 | Dykstra |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson |
| 7,755,310 B2 | 7/2010 | West et al. |
| 7,770,396 B2 | 8/2010 | Roby |
| 7,795,830 B2 | 9/2010 | Johnson |

(56) References Cited

U.S. PATENT DOCUMENTS

| | | |
|---|---|---|
| 7,807,048 B2 | 10/2010 | Collette |
| 7,835,140 B2 | 11/2010 | Mori |
| 7,845,413 B2 | 12/2010 | Shampine |
| 7,900,893 B2 | 3/2011 | Teurlay |
| 7,926,562 B2 | 4/2011 | Poitzsch |
| 7,940,039 B2 | 5/2011 | de Buda |
| 7,894,757 B2 | 7/2011 | Keast |
| 7,977,824 B2 | 7/2011 | Halen et al. |
| 7,984,757 B1 | 7/2011 | Keast |
| 8,037,936 B2 | 10/2011 | Rath |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,221,513 B2 | 7/2012 | Ariyapadi |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| RE44,444 E | 8/2013 | Dole |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Goli |
| 9,119,326 B2 | 8/2015 | McDonnell |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,353,593 B1 | 5/2016 | Lu et al. |
| 9,366,114 B2 | 6/2016 | Coli et al. |
| 9,410,410 B2 | 8/2016 | Broussard |
| 9,450,385 B2 | 9/2016 | Kristensen |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring |
| 9,790,858 B2 | 10/2017 | Kanebako |
| 9,840,901 B2 | 12/2017 | Oehring |
| 9,863,228 B2 | 1/2018 | Shampine et al. |
| 9,893,500 B2 | 2/2018 | Oehring |
| 9,903,190 B2 | 2/2018 | Conrad |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 * | 9/2019 | Oehring .............. E21B 7/022 |
| 10,408,030 B2 | 9/2019 | Oehring |
| 10,408,031 B2 | 9/2019 | Oehring |
| 10,415,332 B2 | 9/2019 | Morris et al. |
| 10,436,026 B2 | 10/2019 | Ounadjela |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2 | 5/2020 | Oehring |
| 10,669,471 B2 | 6/2020 | Schmidt et al. |
| 10,669,804 B2 | 6/2020 | Kotrla |
| 10,686,301 B2 | 6/2020 | Oehring et al. |
| 10,690,131 B2 | 6/2020 | Rashid |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring |
| 10,988,998 B2 | 4/2021 | Fischer et al. |
| 11,091,992 B2 | 8/2021 | Broussard |
| 2001/0000996 A1 | 5/2001 | Grimland et al. |
| 2002/0169523 A1 | 11/2002 | Ross et al. |
| 2003/0079875 A1 | 1/2003 | Weng |
| 2003/0056514 A1 | 3/2003 | Lohn |
| 2003/0057704 A1 | 3/2003 | Baten |
| 2003/0138327 A1 | 7/2003 | Jones et al. |
| 2004/0040746 A1 | 3/2004 | Niedermayr et al. |
| 2004/0045703 A1 | 3/2004 | Hooper et al. |
| 2004/0102109 A1 | 5/2004 | Cratty et al. |
| 2004/0167738 A1 | 8/2004 | Miller |

(56) References Cited

U.S. PATENT DOCUMENTS

| | | |
|---|---|---|
| 2005/0061548 A1 | 3/2005 | Hooper |
| 2005/0116541 A1 | 6/2005 | Seiver |
| 2005/0201197 A1 | 9/2005 | Duell et al. |
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2007/0125544 A1 | 6/2007 | Robinson |
| 2007/0131410 A1 | 6/2007 | Hill |
| 2007/0187163 A1 | 8/2007 | Cone |
| 2007/0201305 A1 | 8/2007 | Heilman |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantei et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2008/0288115 A1 | 11/2008 | Rusnak |
| 2009/0045782 A1 | 2/2009 | Datta |
| 2009/0065299 A1 | 3/2009 | Vito |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek |
| 2009/0093317 A1 | 4/2009 | Kajiwara et al. |
| 2009/0095482 A1 | 4/2009 | Suijaatmadja |
| 2009/0114392 A1 | 5/2009 | Tolman |
| 2009/0145611 A1 | 6/2009 | Pallini, Jr. |
| 2009/0153354 A1 | 6/2009 | Daussin |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins |
| 2009/0315297 A1 | 12/2009 | Nadeau |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0193057 A1 | 8/2010 | Garner |
| 2010/0250139 A1 | 9/2010 | Hobbs |
| 2010/0281876 A1 | 11/2010 | Khan |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier et al. |
| 2011/0061855 A1 | 3/2011 | Case |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0175397 A1 | 7/2011 | Amrine |
| 2011/0197988 A1 | 8/2011 | Van Vliet |
| 2011/0241590 A1 | 10/2011 | Horikoshi |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli |
| 2013/0009469 A1 | 1/2013 | Gillett |
| 2013/0025706 A1 | 1/2013 | DeGaray et al. |
| 2013/0051971 A1* | 2/2013 | Wyse ................. B60P 1/00 414/812 |
| 2013/0078114 A1 | 3/2013 | Van Rijswick |
| 2013/0138254 A1 | 5/2013 | Seals |
| 2013/0175038 A1 | 7/2013 | Conrad |
| 2013/0175039 A1 | 7/2013 | Guidry |
| 2013/0180722 A1 | 7/2013 | Olarte Caro et al. |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1* | 12/2013 | Flusche ............... E21B 7/026 414/800 |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0077607 A1 | 3/2014 | Clarke |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1* | 5/2014 | Broussard ............ E21B 43/26 166/66.4 |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0294603 A1 | 10/2014 | Best |
| 2014/0379300 A1 | 12/2014 | Devine et al. |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0184493 A1* | 7/2015 | McDaniel ............. E04H 9/14 169/69 |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |

(56) References Cited

U.S. PATENT DOCUMENTS

| | | |
|---|---|---|
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0230660 A1 | 8/2016 | Zeitoun et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ceizobka et al. |
| 2017/0226839 A1 | 8/2017 | Broussard |
| 2017/0226842 A1 | 8/2017 | Omont |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Laharuka et al. |
| 2018/0183219 A1 | 6/2018 | Oehring |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang |
| 2018/0343125 A1 | 11/2018 | Clish |
| 2018/0363437 A1 | 12/2018 | Coli |
| 2018/0363640 A1 | 12/2018 | Kajita et al. |
| 2018/0366950 A1 | 12/2018 | Pedersen et al. |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stepheson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien |
| 2020/0325760 A1 | 10/2020 | Markham |
| 2020/0350790 A1 | 11/2020 | Luft et al. |

FOREIGN PATENT DOCUMENTS

| | | |
|---|---|---|
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |

(56) References Cited

FOREIGN PATENT DOCUMENTS

| | | |
|---|---|---|
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 00/47893 | 8/2000 |
| WO | 2009046280 | 4/2009 |
| WO | 2012/051705 | 4/2012 |
| WO | 2014/116761 | 7/2014 |
| WO | 2014/177346 | 11/2014 |
| WO | 2014177346 | 11/2014 |
| WO | 2016/144939 | 9/2016 |
| WO | 2016/160458 | 10/2016 |
| WO | 2018044307 A1 | 3/2018 |
| WO | 2018213925 A1 | 11/2018 |
| WO | 2019210417 | 11/2019 |

OTHER PUBLICATIONS

Non-Final Office Action issued in corresponding U.S. Appl. No. 16/268,030 dated May 10, 2019.
Final Office Action issued in corresponding U.S. Appl. No. 16/210,749 dated Jun. 11, 2019.
Canadian Office Action dated May 30, 2019 in corresponding CA Application No. 2,833,711.
Canadian Office Action dated Jun. 20, 2019 in corresponding CA Application No. 2,964,597.
International Search Report and Written Opinion dated Jul. 9, 2019 in related PCT Application No. PCT/US2019/027584.
Office Action dated Jun. 7, 2019 in related U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Nov. 26, 2019 in related PCT Application No. PCT/US19/51018.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
International Search Report and Written Opinion dated Feb. 11, 2020 in related PCT Application No. PCT/US2019/055323.
Final Office Action dated Mar. 31, 2020 corresponding to U.S. Appl. No. 15/356,436.
Non-Final Office Action dated Mar. 3, 2020 corresponding to U.S. Appl. No. 16/152,695.
UK Power Networks—Transformers to Supply Heat to Tate Modern— from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Patent Application No. PCT/US18/63977.

(56) References Cited

OTHER PUBLICATIONS

International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
International Search Report and Written Opinion dated Jul. 9, 2019 in corresponding PCT Application No. PCT/US2019/027584.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-burner) 06 Sep. 6, 2018 (Sep. 9, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.

"Heat Exchanger" (https://en.wikipedia.org/w/index.php?title=Heat_exchanger&oldid=89300146) Apr. 12-18-19, 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
Morris et al., U.S. Appl. No. 62/526,869; Hydration-Blender Transport and Electric Power Distribution for Fracturing Operation; filed Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
U.S. Pat. No. 10,648,311, 1,804 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al, "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.

(56) References Cited

OTHER PUBLICATIONS

Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-Intelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Pat. No. 10,254,732, 552 pages.
U.S. Appl. No. 62/204,331, 22 pages.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
NPORTIA5250, Moxastore, http://www.moxastore.com/NPORTIA5250_p/nportia5250.htm.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
Excerpt of U.S. Pat. No. 10,119,381, 24 pages.
Excerpt of U.S. Pat. No. 10,934,824, 24 pages.
Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
Kroposki et al., Making Microgrids Work, 6 IEEE Power and Energy Mag. 40, 41 (2008).
Dan T. Ton & Merrill A. Smith, The U.S Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://www.spglobal.com/marketintelligence/en/news-insights/latest-news-headlines/growth-in-electric-fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc., and U.S. Well Services, LLC* v *Halliburton Company, Cimarex Energy Co., Halliburton Energy Services, Inc.,*

(56) References Cited

OTHER PUBLICATIONS and Halliburton US Techologies, Inc., Case No. WA:21-CV-00367-ADA, Document 61, Order Setting Markman Hearing, Nov. 29, 2021, 1 page.

U.S. Well Services, Inc., and U.S. Well Services, LLC v Halliburton Company, Cimarex Energy Co., Halliburton Energy Services, Inc., and Halliburton US Techologies, Inc., Case No. WA:21-CV-00367-ADA, Document 61, Order Resetting Markman Hearing, Dec. 8, 2021, 1 page.

Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.

Gardner Denver, 3" 1502 Male Hammer Union Discharge Flange, 2005, 13 pages.

"Services—U.S. Well Services," http://uswellservices.com/services/, accessed Nov. 13, 2021, 10 pages.

Donald G. Fink, "Standard Handbook for Electrical Engineers—Thirteenth Edition," 1993, McGraw-Hill Inc., pp. 10-3, 20-21, 20-22, 20-85, 20-20, 20-89, 20-90, 20-91, 22-12, 22-13, 22-14, 22-15 and 22-16.

Email from Michael See on Jun. 10, 2021 regarding API-541 Fourth Edition: Public Availability, 2 pages.

Halliburton, Halliburtion All-Electric Fracturing Reducing Emissions and Cost Brochure, 2021, 6 pages.

IEEE Power Engineering Society, 112 IEEE Standard Test Procedure for Polyphase Induction Motors and Generators, 2004, 87 pages.

U.S. Well Services, LLC v Tops Well Services, LLC, Case No. 3:19-cv-237, Document 135, Order, Sep. 22, 2021, 2 pages.

U.S. Well Services, Inc. and U.S. Well Services, LLC v Halliburton Company and Cimarex Energy Co., Case No. 6:21-cv-00367-ADA, Document 56, Defendants' Opening Claim Construction Brief, Oct. 27, 2021, 46 pages.

"Screenshot of USWS Clean Fleet System Video," 1 page.

John Daniel, "8.30 DEP Industry Observations: New Flac Fleet; New Fleet Designs Forthcoming," Daniel Energy Partners, Aug. 30, 2020, 13 pages.

Declaration of Joel N. Broussard, IPR2021-01034, IPR2021-01035, IPR2021-01036, and IPR2021-01037, Oct. 20, 2021, 11 pages.

Declaration of Robert Schaaf, IPR2021-01034, Oct. 20, 2021, 47 pages.

Declaration of Dr. Mark Ehsani, IPR2021-01035, Jun. 18, 2021, 188 pages.

U.S. Pat. No. 9,970,278, 310 pages.

Stan Gibilisco, The Illustrated Dictionary of Electronics: Audio/Video Consumer Electronics Wireless Technology—Eighth Edition, 2001, p. 667.

Declaration of Robert Schaaf, IPR2021-01035, Oct. 20, 2021, 51 pages.

Declaration of Dr. L. Brun Hilbert, P.E., IPR2021-01037 and IPR2021-01038, Jun. 21, 2021, 124 pages.

U.S. Pat. No. 9,745,840, 215 pages.

U.S. Pat. No. 10,408,030, 401 pages.

U.S. Appl. No. 62/242,173, 17 pages.

Declaration of Robert Schaaf, IPR2021-01037, Oct. 20, 2021, 52 pages.

Zeus Electric Pumping Unit, Halliburton, http://www.halliburton.com/en/products/zeus-electric-pumping-unit, 2021, 4 pages.

Declaration of Joel N. Broussard, IPR2021-01038, Oct. 20, 2021, 11 pages.

LedComm LLC v Signify North America Corporation, Case No. 6:20-cv-01056-ADA, Civil Docket, accessed Dec. 8, 2021, 11 pages.

U.S. Well Services, Inc. v Halliburton Company, Case No. 6:21-cv-00367-ADA, Civil Docket, accessed Dec. 13, 2021, 14 pages.

Declaration of Robert Schaaf, IPR2021-01038, Nov. 10, 2021, 40 pages.

Transcend Shipping Systems LLC v Mediterranean Shipping Company S.A., Case No. 6:21-cv-00040, Document 27, Order of Dismissal with Prejudice, Dec. 7, 2021, 1 page.

Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.

America Invents Act, H.R. Rep. No. 112-98, Jun. 1, 2011, 165 pages.

Declaration of Joel N. Broussard, IPR2021-01065, Oct. 20, 2021, 11 pages.

Declaration of Dr. Robert Durham, IPR2021-01065, Jun. 18, 2021, 138 pages.

Declaration of Robert Schaaf, IPR2021-01065, Nov. 10, 2021, 33 pages.

U.S. Pat. No. 9,410,410, Excerpt—Response to Non-Final Office Action filed Feb. 3, 2016, 57 pages.

U.S. Pat. No. 9,840,901, 216 pages.

U.S. Appl. No. 62/242,566, 34 pages.

Industrial Safety & Hygiene News, OSHA issues hazard alert for fracking and drilling, Jan. 6, 2015, 1 page.

Portfolio Media Inc., A Shift to Sand: Spotlight on Silica Use in Fracking, Law360, https://www.law360.com/articles/366057/print?section=energy, accessed Jun. 10, 2021, 5 pages.

Henry Chajet, "OSHA Issues Alert on Non-Silica Fracking Hazards," Jan. 30, 2015, National Law Review Newsroom, 2 pages.

U.S. Well Services, LLC, v Voltagrid LLC, Nathan Ough, Certarus (USA) Ltd., and Jared Oehring, Case No. 4:21-cv-3441-LHR, Document 13, Plaintiff U.S. Well Services, LLC's Motion for Preliminary Injunction and Request for Hearing, Nov. 4, 2021, 311 pages.

U.S. Department of Labor—Occupational Safety and Health Administration, Hydraulic Fracturing and Flowback Hazards Other than Respirable Silica, 27 pages.

U.S. Department of Labor—Occupational Safety and Health Administration, Hazard Alert—Worker Exposure to Silica during Hydraulic Fracturing, 2012, 7 pages.

U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.

Occupational Safety and Health Administration—Home, United States Department of Labor, https://web.archive.org/web/20120722160756/http://www.osha.gov/, accessed Jun. 13, 2021, 2 pages.

Industry/Hazard Alerts, United States Department of Labor, https://web.archive.org/web/20120801064838/http://www.osha.gov:80/hazardindex.html, accessed Jun. 13, 2021, 1 page.

Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard-alert.html, accessed Jun. 13, 2021, 5 pages.

A. Abbott, Crippling the Innovation Economy: Regulatory Overreach at the Patent Office, Regulatory Transparency Project, Aug. 14, 2017, 35 pages.

D. Heidel, Safety and Health Management Aspects for Handling Silica-based Products and Engineered Nanoparticles in Sequences of Shale Reservoir Stimulations Operations, Society of Petroleum Engineers, 2004, 4 pages.

Testimony of Judge Paul R. Michel (Ret.) United States Court of Appeals for the Federal Circuit Before the Subcommittee on Intellectual Property, U.S Senate Committee on the Judiciary, Jun. 4, 2019, 8 pages.

Bernard D. Goldstein, The Role of Toxicological Science in Meeting the Challenges and Opportunities of Hydraulic Fracturing, 2014, Toxicological Sciences, vol. 139, No. 2, pp. 271-283.

Mike Soraghan, OSHA issues hazard alert for fracking and drilling, E&E, Dec. 10, 2014, 1 page.

U.S. Well Services, LLC v Tops Well Services, LLC and Honghua America, LLC, Case No. 3:19-cv-00237, Document 72-9, Declaration of Dr. Robert Schaaf, Apr. 24, 2020, 52 pages.

(56) References Cited

OTHER PUBLICATIONS

*U.S. Well Services, LLC* v *Tops Well Services, LLC and Honghua America, LLC*, Case No. 3:19-cv-00237 Document 72-9, Declaration of Dr. Robert Schaaf—part 2, Apr. 24, 2020, 128 pages.
*U.S. Well Services, LLC* v *Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC* v *Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC* v *Tops Well Services, LLC and Honghua America, LLC*, Case No. 3:19-cv-00237, Document 1, Plaintiff's Original Complaint, 63 pages.
*U.S. Well Services, LLC* v *Tops Well Services, LLC and Honghua America, LLC*, Case No. 3:19-cv-00237, Document 90, Plaintiff's Opposition to Defendants' Motion for Summary Judgment of Invalidity under 35 USC 112, 30 pages.
*U.S. Well Services, LLC* v *Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v *Signfiy North America Corp., Signify Holding B.V., and Signify N.V.*, Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Plaintiff's Disclosure of Asserted Claims and Preliminary Infringement Contentions, Jul. 12, 2021, 9 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.*, Case No. 6:21-cv-00367-ADA, Defendants' Preliminary Invalidity Contentions, Sep. 10, 2021, 193 pages.
*U.S. Well Services, Inc. and U.S. Well Services, LLC* v *Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph D., Case Nos. IPR2021-01032, IPR2021-01033, and IPR2021-01034, Jun. 18, 2021, 173 pages.
Stephen Cary et al, "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
U.S. Pat. No. 8,789,601, 159 pages.
U.S. Pat. No. 9,410,410, 263 pages.
U.S. Pat. No. 10,337,308, 861 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-fracturing-technology-reduces-emissions-by-99.html, 4 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
D. Bogh et al., "A User's Guide to Factory Testing of Large Motors: What Should Your Witness Expect," IEEE, accessed Jun. 10, 2021, 8 pages.
Ryan Davis, "Albright Says He'll Very Rarely Put Cases on Hold for PTAB," Law 360, https://www.law360.com/articles/1381597/print?section=ip, 2 pages.
Dani Kass, "Fintiv Fails: PTAB Uses 'Remarkably Inaccurate' Trial Dates," Nov. 2, 2021, Law 360, 1 page.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards . . . , accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.

(56) References Cited

OTHER PUBLICATIONS

J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
Publications, U.S. Department of Labor—Occupational Safety and Health Administration, https://web.archive.org/web/20150626140537/https://www.osha.gov/pls/publications/publication.html, 47 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
U.S. Department of Labor—Occupational Safety and Health Administration, https://web.archive.org/web/20150406152927/https://www.osha.gov/, 4 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
U.S. Pat. No. 10,020,711, 250 pages.
U.S. Appl. No. 62/323,303, 62 pages.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
U.S. Pat. No. 10,526,882, 845 pages.
U.S. Appl. No. 62/180,289, 32 pages.
IEEE 100 The Authoritative Dictionary of IEEE Standards Terms Seventh Edition, 2000, 7 pages.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Electrical Engineering Reference Manual, 12 pages.
Professional Publications, Inc., Books for the FE, PE, FLS and PLS Exams, Spring 2004, http://www.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
Excerpt of U.S. Pat. No. 9,893,500, 106 pages.
U.S. Pat. No. 9,893,500, 291 pages.
U.S. Appl. No. 62/323,168, 41 pages.
*U.S. Well Services, Inc. and U.S. Well Services, LLC v Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc. v Halliburton Company*, Case No. 6:21-cv-00367-ADA, Civil Docket, accessed Dec. 17, 2021, 14 pages.
*U.S. Well Services, Inc. v Halliburton Company*, Case No. 6:21-cv-00367-ADA, Document 64, Order Resetting Markman Hearing, Dec. 8, 2021, 1 page.
Approved American National Standard, ANSI/NEMA MG 1-2011, American National Standard Motors and Generators, Dec. 9, 2021, 636 pages.
Comprehensive Power: Power it Up, Feb. 27, 2013, 28 pages.
Comprehensive Power: Power it Up, Brochure, 26 pages.
Declaration of Robert Schaaf, IPR2021-01316, Nov. 19, 2021, 33 pages.
Declaration of Robert Durham, IPR2021-01316, Aug. 13, 2021, 75 pages.
U.S. Pat. No. 10,280,724, 668 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.

(56) References Cited

OTHER PUBLICATIONS

U.S. Pat. No. 10,408,031, 734 pages.
Maxwell James Clerk 1868, On Governors, Proc. R. Soc. Lond., pp. 16270-16283.
Katsuhiko Ogata, Modern Control Engineering: Third Edition, 1997, 2 pages.
49 C.F.R. Part 393 (Oct. 1, 2006), 36 pages.

* cited by examiner

SLIDE OUT PUMP STAND FOR HYDRAULIC FRACTURING EQUIPMENT

CROSS REFERENCE TO RELATED APPLICATIONS

This application is a continuation of U.S. patent application Ser. No. 15/217,081, filed Jul. 22, 2016, titled "SLIDE OUT PUMP STAND FOR HYDRAULIC FRACTURING EQUIPMENT," now U.S. Pat. No. 10,407,990, issued Sep. 10, 2019, which claims priority to and the benefit of U.S. Provisional Application Ser. No. 62/196,525, filed Jul. 24, 2015, the full disclosures of which are hereby incorporated by reference herein for all purposes.

BACKGROUND OF THE INVENTION

1. Field of Invention

The present disclosure relates to a system for hydraulically fracturing a subterranean formation. More specifically, the present disclosure relates to a frame for hydraulic fracturing equipment that includes a retractable platform.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid, whose primary component is usually water, includes proppant (such as sand or ceramic) that migrate into the fractures with the fracturing fluid and remain to prop open the fractures after pressure is no longer applied to the wellbore.

The fracturing fluid is usually pressurized on surface by high pressure pumps powered by diesel engines. To produce the pressures required for hydraulic fracturing, the pumps and associated engines have substantial volume and mass. Heavy duty trailers are required for transporting the large and heavy pumps and engines to sites where wellbores are being fractured. Each pump is usually equipped with a water manifold (referred to as a fluid end) which contains seats, valves, and keepers internally. These parts allow the pump to draw in low pressure fluid (approximately 100 psi) and discharge the same fluid at high pressures (over 10,000 psi). These seats and valves often erode due to the proppant in the fracturing fluid; which sometimes requires frequent replacement. Replacing the eroded components can be hazardous as the fluid ends are typically above grade on mobile trailers, and which generally have limited space on which maintenance personnel can stand. The height hazard is compounded by the use of heavy pump tools for assembly and disassembly of the fluid end for part replacement.

SUMMARY OF THE INVENTION

Disclosed herein is an example of a hydraulic fracturing system for fracturing a subterranean formation and which includes a plurality of electric pumps fluidly connected to the formation, and powered by at least one electric motor, and configured to pump fluid at high pressure into a wellbore that intersects the formation, so that the fluid passes from the wellbore into the formation, and fractures the formation, a variable frequency drive connected to the electric motor to control the speed of the motor, wherein the variable frequency drive frequently performs electric motor diagnostics to prevent damage to the at least one electric motor, a trailer on which the motor and pumps are mounted, and a platform assembly mounted to the trailer and from which at least a one of the pumps are accessible by operations personnel. The platform assembly can be selectively moveable between a stowed configuration and spaced laterally inward from an outer periphery of wheels coupled with the trailer, to a deployed configuration and spaced laterally past an outer periphery of the wheels. In one example, support rails are mounted to the platform assembly that slidingly engage mount assemblies that are coupled to the trailer. Bores are optionally formed in the support rails register with holes in the mount assemblies when the platform assembly is in the stowed configuration, and wherein a pin selectively inserts through the bores and holes to anchor the platform assembly in the stowed configuration. Rollers may optionally be included in the mount assemblies that rotate when the support rails slidingly engage the mount assemblies. In an example, the platform assembly includes a lateral rail assembly on a side that is distal from the pump. Further included in this example embodiment are end gates on forward and aft ends of the platform assembly that are pivotingly mounted on opposing axial ends of the lateral rail assembly. The end gates can swing into orientations that are substantially perpendicular with the lateral rail assembly when the platform assembly is moved into a deployed configuration. In one embodiment, a pair of motors are first and second motors, and a pair of pumps are first and second pumps, wherein the first and second pumps and motors are mounted on the trailer, wherein the first motor is coupled to and drives the first pump, and wherein the second motor is coupled to and drives the second pump.

Also described herein is a hydraulic fracturing system for fracturing a subterranean formation and that includes a trailer, a pump on the trailer that selectively pressurizes fracturing fluid, an electrically powered motor that drives the pump, a variable frequency drive in electrical communication with the motor, and a platform assembly coupled with the trailer and that is adjacent the pump so that when operations personnel are on the platform assembly, locations on the pump are accessible by the operations personnel. In one example, the platform assembly is stowed so that an outer lateral side of the platform assembly is set laterally inward from an outer edge of wheels that are mounted to the trailer. The platform assembly can be moveable from being stowed into a deployed configuration where the platform assembly projects laterally past the wheels. In one embodiment, the platform assembly includes a lateral rail assembly, a forward gate, and an aft gate and which define a safety barrier for operations personnel on the platform assembly. The gates can each have a lateral side that is affixed by a hinge to the lateral rail assembly and on opposite sides, the hinge can be made up of a vertically oriented pin and spring, wherein the spring swings free ends of the gates away from the lateral rail assembly when the platform assembly is changed from a stowed configuration to a deployed configuration. Elastomeric bungees can be included that each having an end affixed to the lateral rail assembly, and free ends that selectively insert into slotted clips affixed to inner frames on the gates. Stop members can be included on the gates that mount to inner frames on the gates and abut the pins when the gates rotate to positions that are substantially perpendicular with the lateral rail assembly. In one embodiment, the platform assembly includes a platform with a deck and frame, support rails that coupled to the platform, and mounting assemblies attached to a frame of the trailer and which slidingly receive the support rails.

BRIEF DESCRIPTION OF DRAWINGS

Some of the features and benefits of the present invention having been stated, others will become apparent as the description proceeds when taken in conjunction with the accompanying drawings, in which.

Figure 1:
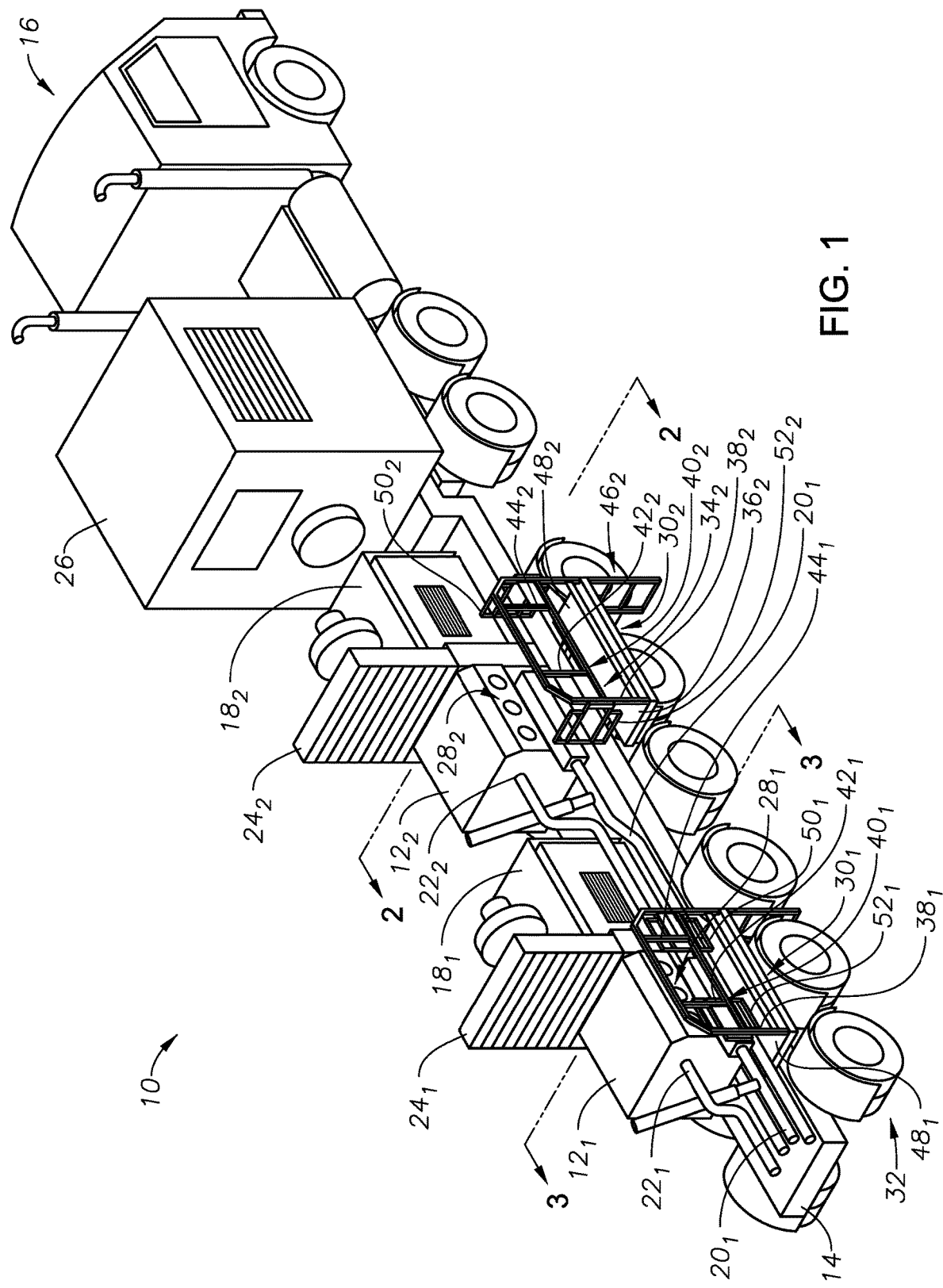
FIG. 1 is a perspective view of an example of a trailerized pump system.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side perspective view in FIG. 1 is one example of a trailerized pump system 10 which is shown having pumps $12_1$, $12_2$ mounted on a trailer 14. As described in more detail below, pumps $12_1$, $12_2$ pressurize fracturing fluid that is then delivered into a wellbore for fracturing a formation. In the illustrated example, the pumps $12_1$, $12_2$ are mounted on the trailer 14; where trailer 14 couples with a tractor 16 for transporting the trailer 14 and pumps $12_1$, $12_2$ to different locations. Also mounted on trailer 14 are motors $18_1$, $18_2$ which are used for driving pumps $12_1$, $12_2$ and which are electrically powered. Suction piping leads $20_1$, $20_2$ respectively couple to a suction side of pumps $12_1$, $12_2$ and which provide the fracturing fluid to pumps $12_1$, $12_2$. Similarly, discharge piping leads $22_1$, $22_2$ transfer the fluid pressurized by pumps $12_1$, $12_2$ to their destination. Radiators $24_1$, $24_2$ are further shown on trailer 14 and are provided for cooling hydraulic fluids associated with the pumps $12_1$, $12_2$ and motors $18_1$, $18_2$. A control room 26 is depicted at a forward end of trailer 14 proximate tractor 16, and which houses various controls and monitoring displays (not shown) for operating devices located within system 10.

Mounted on a side of pumps $12_1$, $12_2$ facing the lateral side of trailer 14 are cover plate sets $28_1$, $28_2$, which when removed provide access to various components within pumps $12_1$, $12_2$ that require regular maintenance as well as repair and replacement. Example components include seals, valves, seats, and keepers (not shown). Accordingly, platform assemblies $30_1$, $30_2$ are shown provided with trailer 14 and which can selectively be deployed so that operations personnel can access the pumps $12_1$, $12_2$ and remove cover plate sets $28_1$, $28_2$ for repairing pumps $12_1$, $12_2$. More specifically, platform assembly $30_1$ is shown in a stowed position and proximate a lateral side of trailer 14, whereas platform assembly $30_2$ is shown in a deployed configuration and slid laterally outward from the lateral edge of trailer 14. When in the stowed configuration, platform assembly $30_1$ is set above wheels 32 that are mounted onto trailer 14. The platform assemblies $30_1$, $30_2$ are strategically formed so that when they are each in the stowed position their outer lateral peripheries terminate within the outer edge of wheels 32. Thus when in the stowed position, the platform assemblies $30_1$, $30_2$ are set laterally inward from the outer edge of the wheels 32, which prevents interference between the platform assemblies $30_1$, $30_2$ and other objects when the system 10 is in transit.

Figure 2:
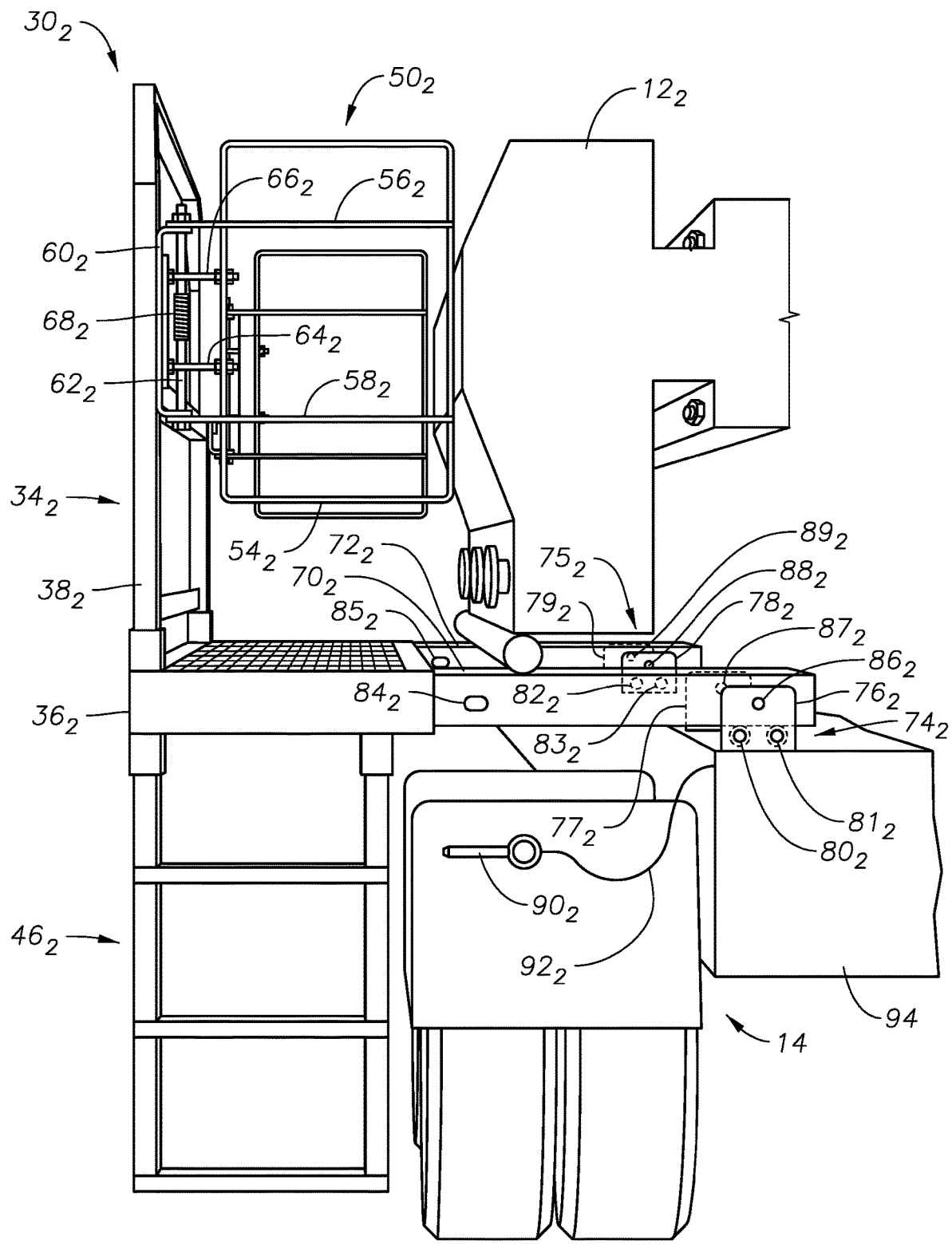
FIG. 2 is an end view of an example of a platform assembly for use with the trailerized pump system of FIG. 1 and in a deployed configuration.
Figure 3:
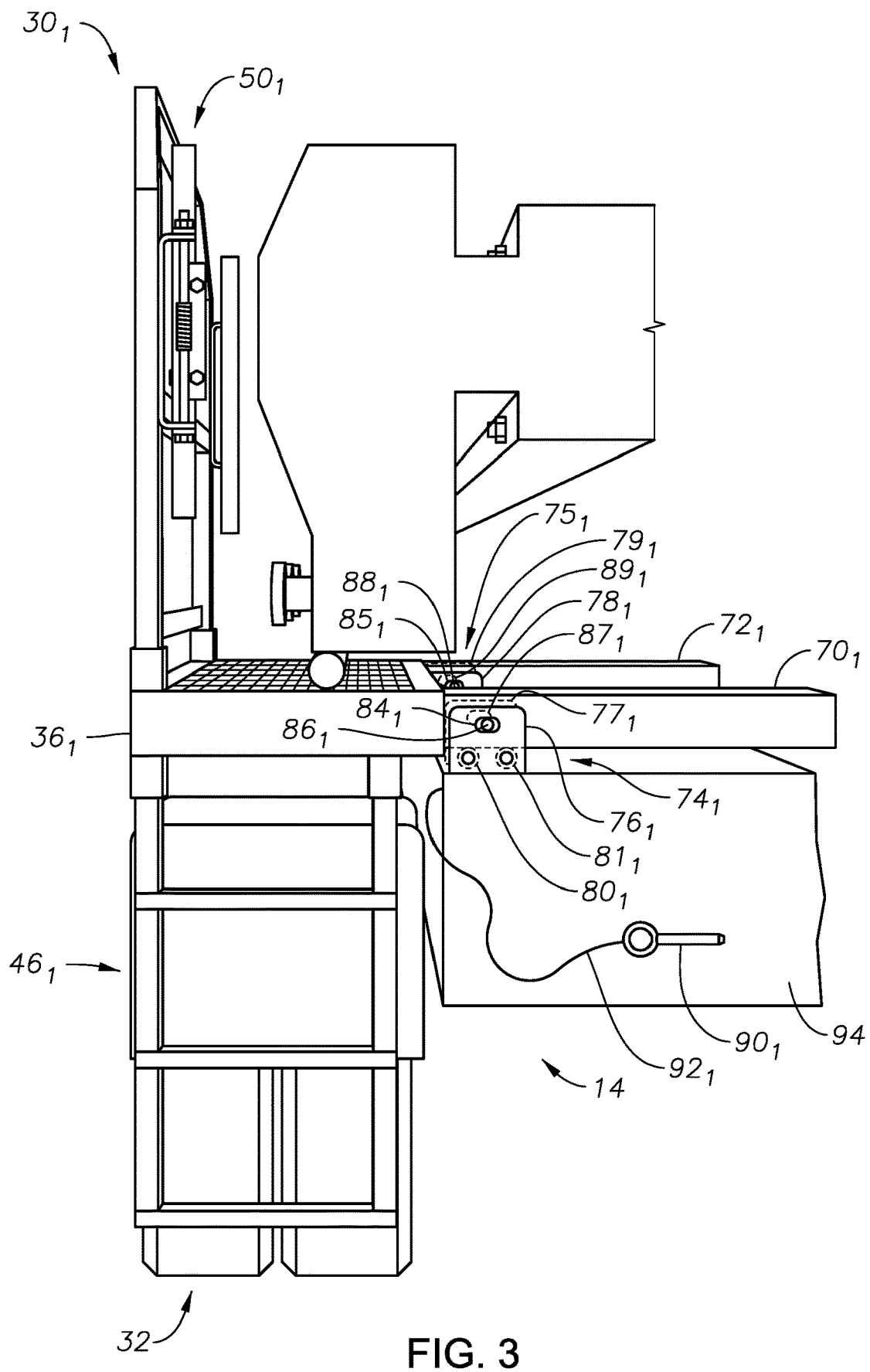
FIG. 3 is an end view of an example of a platform assembly for use with the trailerized pump system of FIG. 1 and in a stowed configuration.

Referring now to FIGS. 1, 2, and 3, lateral rail assembly $34_1$, $34_2$ are respectively provided on platform assemblies $30_1$, $30_2$. Lateral rail assemblies $34_1$, $34_2$ are transversely mounted on a platform 36 that is generally parallel with an upper surface of trailer 14. A frame $38_1$, $38_2$, which makes up a part of the lateral rail assemblies $34_1$, $34_2$, is a generally U-shaped member and having either a circular or rectangular cross-section. Opposing ends of frame $38_1$, $38_2$, mount onto corners of the platform 36 distal from its coupling with trailer 14. Mid-beams $40_1$, $40_2$ are shown extending between vertically disposed portions of frame $38_1$, $38_2$. Balusters $44_1$, $44_2$ are illustrated that vertically span the distance between mid-beams $40_1$, $40_2$ and upper longitudinally extending portions of frames $38_1$, $38_2$. A forward end of each of the platform assemblies $30_1$, $30_2$ includes a ladder assembly $46_1$, $46_2$ which provides rungs and side rails on which operations personnel can climb onto platform $36_1$, $36_2$. Each platform $36_1$, $36_2$ includes a deck $48_1$, $48_2$ which extends in generally the same plane as platform $36_1$, $36_2$. Each deck $48_1$, $48_2$ may optionally be solid, or formed from a grated material with openings therethrough so that liquids and other slippery substances can fall therethrough and avoid a slick surface for operations personnel working on platforms $36_1$, $36_2$. In an embodiment, the platform assemblies $30_1$, $30_2$ are strategically formed so that operations personnel on the platform assemblies $30_1$, $30_2$ can access a coupler (not shown) between the pumps $12_1$, $12_2$, and motors $18_1$, $18_2$.

Forward ends of the platform assemblies $30_1$, $30_2$ are fitted with forward gates $50_1$, $50_2$ that selectively pivot respectively from the forward ends frames $38_1$, $38_2$ and provide a safety barrier to prevent operations personnel from accidentally falling from platforms $36_1$, $36_2$. However, because the gates $50_1$, $50_2$, $52_1$, $52_2$ are pivotally mounted, they can be rotated back against the frames so that operations personnel can access or leave the platform assemblies $30_1$, $30_2$. Similarly, aft gates $52_1$, $52_2$ are provided on ends of frame $38_1$, $38_2$ distal from forward gates $50_1$, $50_2$. Referring now to FIG. 2, which is taken along lines 2-2 of FIG. 1, shown in side view is an example of forward gate $50_2$, and which includes an outer frame $54_2$, which is a generally elongate member and fashioned into a rectangular shape. Provided with the outer frame $54_2$ are longitudinally extending arms $56_2$, $58_2$ that are vertically spaced apart from one another, and project between the vertical portions of the member of outer frame $54_2$. Ends of the arms $56_2$, $58_2$ couple onto a mounting bracket 602 which mounts to a vertical portion of frame $38_2$. A vertically oriented rod 622 projects through holes formed in ends of arms $56_2$, $58_2$. The holes in the ends of arms $56_2$, $58_2$ register with holes bored in horizontally disposed sections of the mounting bracket 602. Rod 622 projects through holes in arms $56_2$, $58_2$ and in bracket 602 thereby pivotally coupling together the forward gate $50_2$ and frame $38_2$. Stop members 642, 662 also couple into a vertical section of outer frame $54_2$ and abut a panel mounted to frame $38_2$ thereby limiting the rotational motion of the forward gate $50_2$. A spring $68_2$ circumscribes a portion of the rod 622 and when the platform assembly $30_2$ is moved into the deployed position as shown in FIG. 2, the spring $68_2$ pivotingly urges the forward gate $50_2$ away from frame $38_2$. Aft gate $52_2$, which is substantially similar to forward gate $50_2$, also includes a spring that causes aft gate $52_2$ to pivotingly swing aft gate $52_2$ away from frame $38_2$. Thus the combination of gates $50_2$, $52_2$ and frame $38_2$ define a safety barrier for operations personnel disposed on the deck $48_2$ and prevents operations personnel from falling from platform $36_2$.

Referring now to FIGS. 2 and 3, support rails $70_{1,2}$, $72_{1,2}$ are shown which are generally elongate members that are horizontally disposed, and project laterally inward from platforms $36_1$, $36_2$. More specifically, support rails $70_1$, $72_1$ are coupled with platform $36_1$, and support rails $70_2$, $72_2$ are coupled with platform $36_2$. Support rails $70_1$, $72_1$ slidingly engage mount assemblies $74_1$, $75_1$ respectively, and support rails $70_2$, $72_2$ slidingly engage mount assemblies $74_2$, $75_2$ respectively. Mount assembly $74_1$ is made up of a pair of vertically disposed lateral plates $76_1$, $77_1$ that are substantially parallel with one another and axially spaced apart. Similarly, mount assembly $74_2$ is made up of a pair of vertically disposed lateral plates $76_2$, $77_2$ that are also substantially parallel with one another and axially spaced apart. Support rail $70_1$ engages mount assembly $74_1$ between plates $76_2$, $77_2$. Further, mount assembly $75_1$ is made up of a pair of vertically disposed and parallel lateral plates $78_1$, $79_1$; and mount assembly $75_2$ includes lateral plates $78_2$, $79_2$ that are also substantially parallel with one another and axially spaced apart. Rollers $80_1$, $81_1$ span between lateral plates $76_1$, $77_1$ and which support rail $70_1$ as it slidingly reciprocates with respect to mount assembly $74_1$. Rollers $80_2$, $81_2$ connected between lateral plates $76_2$, $77_2$ provide rolling support for rail $71_2$, rollers (not shown) extend between lateral plates $78_1$, $79_1$ which bolster support rail $72_1$, and rollers $82_2$, $83_2$ are anchored across lateral plates $78_2$, $79_2$ to provide rolling support for support rail $72_2$.

The sliding engagement of the support rails $70_{1,2}$, $72_{1,2}$ with the mount assemblies $74_{1,2}$, $75_{1,2}$ allows the platform assemblies $30_1$, $30_2$ to be readily moved between the stowed and deployed configurations of FIG. 2. Further, rollers or other structure (not shown) slidingly contacts an upper surface of rails $70_{1,2}$, $72_{1,2}$ which maintains the rails $70_{1,2}$, $72_{1,2}$ in a generally horizontal orientation so that the decks $48_1$, $48_2$ remain substantially horizontal when the platform assemblies $30_1$, $30_2$ are deployed and when stowed. Bores $84_{1,2}$, $85_{1,2}$ are shown formed axially through the support rails $70_{1,2}$, $72_{1,2}$, and that selective register with holes $86_{1,2}$, $87_{1,2}$, $88_{1,2}$, $89_{1,2}$, formed through the lateral plates $76_{1,2}$, $77_{1,2}$, $78_{1,2}$, $79_{1,2}$, allow pins $90_{1,2}$ to be inserted therethrough thereby locking support rails $70_{1,2}$, $72_{1,2}$, to the mount assemblies $74_{1,2}$, $75_{1,2}$ and thereby coupling and securing the platform assemblies $30_1$, $30_2$ to the trailer 14. Lanyards $92_{1,2}$ are shown holding pins $90_{1,2}$ to the trailer frame 94.

Figure 4:
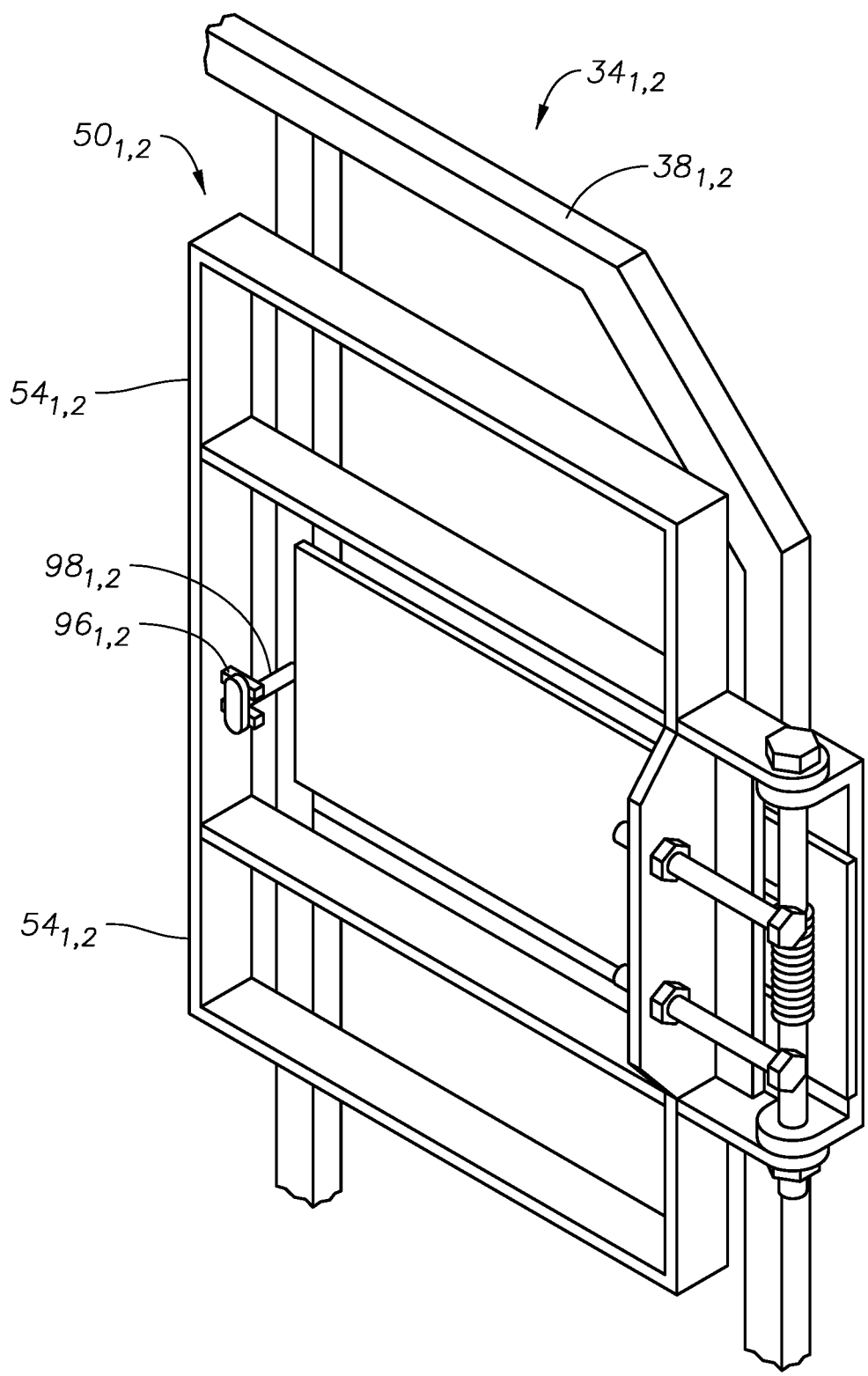
FIG. 4 is a perspective view of an example of a gate that is part of the platform assemblies of FIGS. 2 and 3.

Referring now to FIG. 4, in this example gates $50_{1,2}$ are shown in the retracted position with their outer frames $54_{1,2}$ adjacent to and parallel with the frames $38_{1,2}$ of the rail assemblies $34_{1,2}$. In this example, slotted clips $96_{1,2}$ are provided on the frames $54_{1,2}$ and in which enlarged ends of bungees $98_{1,2}$ selectively are inserted into the clips $96_{1,2}$ which retain the gates $50_{1,2}$ against the frames $38_{1,2}$ when the platform assemblies $30_1$, $30_2$ (FIG. 1) are in their retracted or stowed positions. In an embodiment, bungees $98_{1,2}$ are formed from an elastomeric material.

Figure 5:
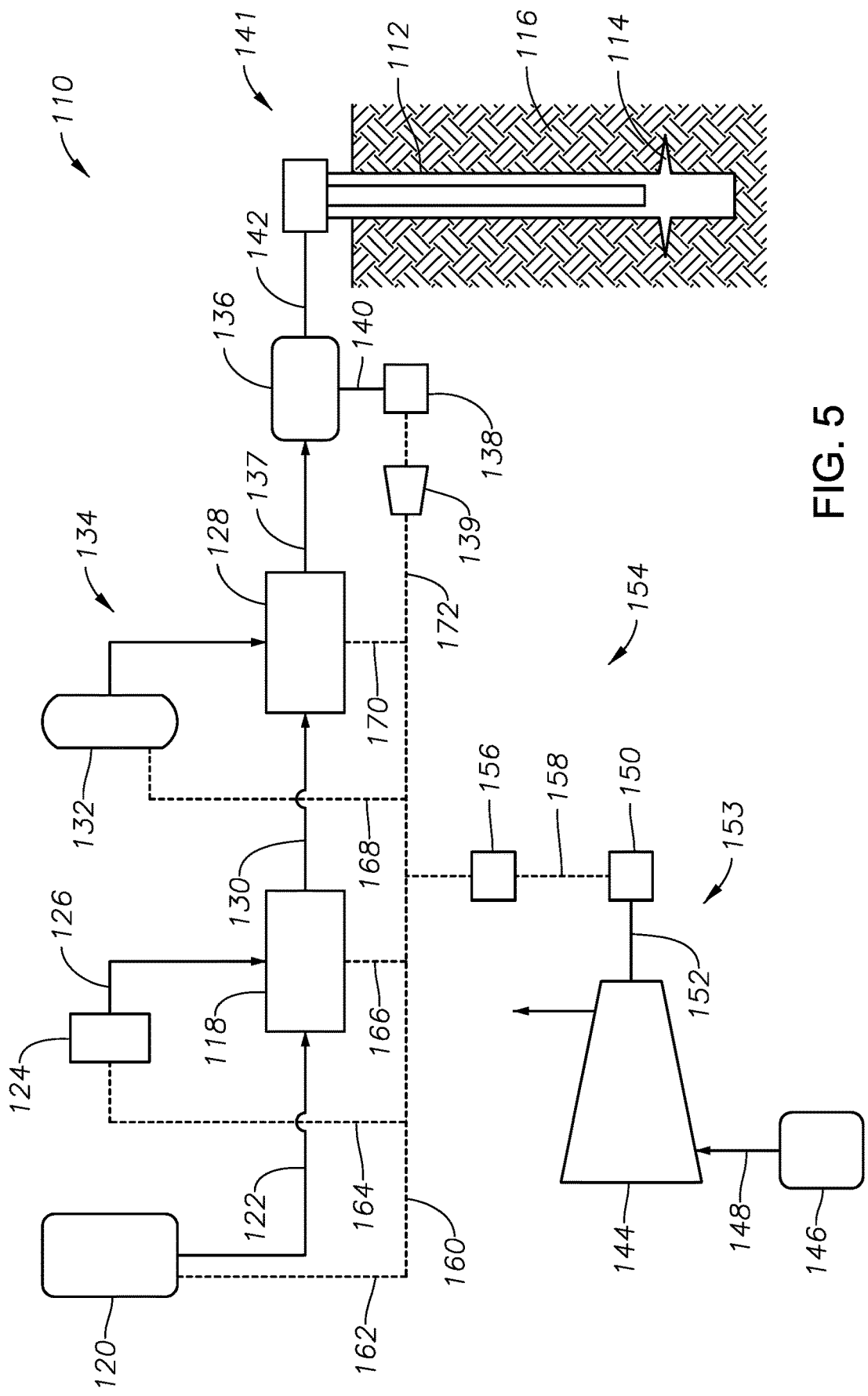
FIG. 5 is a schematic example of a hydraulic fracturing system.

FIG. 5 is a schematic example of a hydraulic fracturing system 110 that is used for pressurizing a wellbore 112 to create fractures 114 in a subterranean formation 116 that surrounds the wellbore 112. Included with the system 110 is a hydration unit 118 that receives fluid from a fluid source 120 via line 122, and also selectively receives additives from an additive source 124 via line 126. Additive source 124 can be separate from the hydration unit 118 as a stand along unit, or can be included as part of the same unit as the hydration unit 118. The fluid, which in one example is water, is mixed inside of the hydration unit 118 with the additives. In an embodiment, the fluid and additives are mixed over a period of time to allow for uniform distribution of the additives within the fluid. In the example of FIG. 5, the fluid and additive mixture is transferred to a blender 128 via line 130. A proppant source 132 contains proppant, which is delivered to the blender 128 as represented by line 134, where line 134 can be a conveyer. Inside the blender 128, the proppant and fluid/additive mixture are combined to form a slurry, which is then transferred to a fracturing pump 136 via line 137. Blender 128 can have an onboard chemical additive system, such as with chemical pumps and augers. Optionally, additive source 124 can provide chemicals to blender 128; or a separate and standalone chemical additive system (not shown) can be provided for delivering chemicals to the blender 128. In an example, the pressure of the slurry in line 137 ranges from around 80 psi to around 100 psi. The pressure of the slurry can be increased up to around 15,000 psi by pump 136. A motor 138, which connects to pump 136 via shaft 140, drives pump 136 so that it can pressurize the slurry. In one example, the motor 138 is controlled by a variable frequency drive ("VFD") 139. After being discharged from pump 136, slurry is injected into a wellhead assembly 141; discharge piping 142 connects discharge of pump 136 with wellhead assembly 141 and provides a conduit for the slurry between the pump 136 and the wellhead assembly 141. In an alternative, hoses or other connections can be used to provide a conduit for the slurry between the pump 136 and the wellhead assembly 141. Optionally, any type of fluid can be pressurized by the fracturing pump 136 to form an injection fluid that is then injected into the wellbore 112 for fracturing the formation 114, and is not limited to fluids having chemicals or proppant. In one example, a one or more of the trailerized pump systems 10 of FIG. 1 is made up of the fracturing pump 136, motor 138, and VFD 139.

An example of a turbine 144 is provided in the example of FIG. 1 and which receives a combustible fuel from a fuel source 146 via a feed line 148. In one example, the combustible fuel is natural gas, and the fuel source 146 can be a container of natural gas or a well (not shown) proximate the turbine 144. Combustion of the fuel in the turbine 144 in turn powers a generator 150 that produces electricity. Shaft 152 connects generator 150 to turbine 144. The combination of the turbine 144, generator 150, and shaft 152 define a turbine generator 153. In another example, gearing can also be used to connect the turbine 144 and generator 150. An example of a micro-grid 154 is further illustrated in FIG. 5, and which distributes electricity generated by the turbine generator 153. Included with the micro-grid 154 is a transformer 156 for stepping down voltage of the electricity generated by the generator 150 to a voltage more compatible for use by electrical powered devices in the hydraulic fracturing system 110. In another example, the power generator by the turbine generator 153 and the power utilized by the electrical powered devices in the hydraulic fracturing system 110 are of the same voltage, such as 4160 V so that main power transformers are not needed. In one embodiment, multiple 3500 kVA dry cast coil transformers are utilized. Electricity generated in generator 150 is conveyed to transformer 156 via line 158. In one example, transformer 156 steps the voltage down from 13.8 kV to around 600 V. Other step down voltages can include 4,160 V, 600V, 480 V, or other voltages. The output or low voltage side of the transformer 156 connects to a power bus 160, lines 162, 164, 166, 168, 170, and 172 connect to power bus 160 and deliver electricity to electrically powered end users in the system 110. More specifically, line 162 connects fluid source 120 to bus 160, line 164 connects additive source 124 to bus, line 166 connects hydration unit 118 to bus 160, line 168 connects proppant source 132 to bus 160, line 170 connects blender 128 to bus 160, and line 172 connects motor 138 to bus 160. In an example, additive source 124 contains ten or more chemical pumps for supplementing the existing chemical pumps on the hydration unit 118 and blender 128. Chemicals from the additive source 124 can be delivered via lines 126 to either the hydration unit 118 and/or the blender 128.

An advantage of the micro-grid 54 is that it can reduce noise. Further, in conjunction with the micro-grid 154, when multiple fracturing pump systems 10 are employed, the pumps 136 can be arranged along a single side of the system 110 to create one high voltage area. Optionally, generators other than turbine generators can be included in the system 110, such as diesel engine generators or natural gas engine generators. In an example when the combustion fuel is natural gas, electric natural gas screw compressors can be included that operate on 480 V delivered from small transformers on the turbine—which can provide 480 power for the turbine motor control center (not shown) as well as the gas compressors. In an alternative example, the power generation can take place at a remote site with power being transmitted to the well pad. In one embodiment load banks can be incorporated into the micro grid. Load shed devices can be incorporated into the micro grid, as well as cooling units for the turbine air intake. Switchgears for power distribution can be included, and that may be trailer mounted, on a skid, or truck. Optionally included are 3500 kVA transformers to transform power from 13.8 kV to 600 V (working voltage), but can be other voltages. An auxiliary unit (not shown) can be included with the system 110 and which provides power for blender unit 128, hydration unit 118, chemical additive/liquid unit, sand conveyer belt, dust vacuum system, wireline, data van, water transfer, heaters, and other needed electrical connections on one or more voltages to the mobile micro power grid. In one embodiment, each auxiliary unit includes, 3500 kVA transformer, variable frequency drive for blender discharge pump's electric motor, 1750 HP, 600 V, 1700 amp 6 pulse VFD. For each VFD, a six pulse converter section employs diode bridge rectification to convert AC to DC. Converter section is unaffected by phase rotation/phase sequence. Overall DC bus design is passive capacitive filter to minimize ripple and maximize power-loss ride-through. DC bus capacitance (total filter capacitance) can be used that is sized to eliminate any requirement for bus inductance (for filtering purposes) when used on a 3-phase system. DC Bus voltage and current can be monitored by a control section to prevent damage to either the drive or the driven equipment. An inverter section makes use of the insulated gate bipolar transistor ("IGBT") power switching transistors to convert DC to three-phase, variable frequency, sinusoidal coded Pulse Wide Modulation ("PWM") waveform. IGBT initialization testing can be performed by the control section on each power up and run command. Each IGBT can have reversed biased diodes (freewheeling) to prevent failure when subjected to motor discharge spikes. Each IGBT can be sized (current) to allow the drive to operate at 100% (current) continuous and 120% (current) for up to 60 seconds. Output currents in each phase can be monitored using Hall Effect current transducers to enable control of flux current, torque current, and providing protection to both the drive and driven equipment. The inverter section can sense and interrupt a phase-to-phase or phase-to-ground fault on the output of the drive. In an example, the control section is designed to prove complete monitoring and protection of drive internal operations while communicating to users at the equipment or at the datavan through one or more user interfaces. Microprocessor logic circuits can be isolated from power circuits. Microprocessor diagnostics can be performed (on application of power) to prove functionality and viability of the microprocessor. Motor diagnostics can be performed (on application of power and each start) to prevent damage to a grounded or shorted motor. The motor diagnostics may be disabled when using a low impedance or high-speed motor. The output voltage can be adjustable from 0 to rated input voltage. The output frequency range can be adjustable for a maximum frequency output of 299 Hz. The output (inverter) section of the VFD can produce a pulse width modulation ("PWM") sinusoidal coded waveform. The motor control center can include soft start for blender hydraulics' electric motor with full voltage non-reversing and hand-off-auto switch. Soft start can be included for hydration units hydraulics' electric motor with full voltage non-reversing and hand-off-auto switch. In one example, as part of the micro grid, VFDs as described above can be used to control the speed of electric motors on frac pumps, blenders, water transfer, and other equipment as needed. In addition, soft starts can be used to start electric motors that are connected to blender, hydration, and/or chemical additive unit hydraulic systems and other equipment that does not need variable frequency drive or variable speed. A motor soft starter is a device used with AC electrical motors to temporarily reduce the load and torque in the power train and electric current surge of the motor during start-up. This reduces the mechanical stress on the motor and shaft, as well as the electrodynamic stresses on the attached power cables and electrical distribution network, extending the lifespan of the system. In one example a soft start and/or VFD can be provided for a separate chemical additive unit or other needed equipment. These components can be packaged onto a single unit or be separated and packaged on different units.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation comprising:
    a plurality of electric pumps fluidly connected to the formation, and powered by at least one electric motor;
    a platform on which the motor and pumps are mounted;
    a platform assembly, comprising a lateral rail assembly, from which at least a one of the pumps are accessible by operations personnel;
    support rails mounted to the platform assembly;
    further comprising end gates on forward and aft ends of the platform assembly, the end gates oriented substantially perpendicular to the lateral rail assembly when the platform assembly is moved into a deployed configuration; and
    a trailer, wherein the support rails mounted to the platform assembly slidingly engage mount assemblies that are coupled to the trailer.

2. The hydraulic fracturing system of claim 1, wherein the platform assembly is selectively moveable between a stowed configuration and spaced laterally inward from an outer periphery of wheels coupled with the trailer, to a deployed configuration and spaced laterally past an outer periphery of the wheels.

3. The hydraulic fracturing system of claim 1, wherein bores in the support rails register with holes in the mount assemblies when the platform assembly is in the stowed configuration, and wherein a pin selectively inserts through the bores and holes to anchor the platform assembly in the stowed configuration.

4. The hydraulic fracturing system of claim 1, further comprising rollers in the mount assemblies that rotate when the support rails slidingly engage the mount assemblies.

5. The hydraulic fracturing system of claim 1, wherein the lateral rail assembly on a side that is distal from the pump.

6. The hydraulic fracturing system of claim 1, wherein a pair of motors comprise first and second motors, a pair of pumps comprise first and second pumps, wherein the first and second pumps and motors are mounted on the trailer, wherein the first motor is coupled to and drives the first pump, and wherein the second motor is coupled to and drives the second pump.

7. A hydraulic fracturing system for fracturing a subterranean formation comprising:
    a platform;
    a pump that selectively pressurizes fracturing fluid;
    an electrically powered motor that drives the pump;
    a platform assembly that is adjacent the pump so that when operations personnel are on the platform assembly, locations on the pump are accessible by the operations personnel;
    the platform assembly further comprising a platform with a deck and frame, support rails coupled to the platform, and end gates on forward and aft ends of the platform assembly, the end gates oriented substantially perpendicular to the support rails when the platform assembly is moved into a deployed configuration;
    a trailer; and
    mounting assemblies attached to a frame of the trailer and which slidingly receive the support rails.

8. The hydraulic fracturing system of claim 7, wherein the platform assembly is stowed so that an outer lateral side of the platform assembly is set laterally inward from an outer edge of wheels that are mounted to the trailer.

9. The hydraulic fracturing system of claim 8, wherein the platform assembly is moveable from being stowed into a deployed configuration where the platform assembly projects laterally past the wheels.

10. The hydraulic fracturing system of claim 7, wherein the gates each have a lateral side that is affixed by a hinge to the platform assembly and on opposite sides, the hinge comprising a vertically oriented pin and spring, wherein the spring swings free ends of the gates away from the platform assembly when the platform assembly is changed from a stowed configuration to a deployed configuration.

11. The hydraulic fracturing system of claim 10, further comprising elastomeric bungees, each having an end affixed to the lateral rail assembly, and free ends that selectively insert into slotted clips affixed to inner frames on the gates.

12. The hydraulic fracturing system of claim 11, further comprising stop members on the gates that mount to inner frames on the gates and abut the pins when the gates rotate.

* * * * *